3,733,317
METHOD FOR THE PREPARATION OF OMEGA-LACTAMS AND THEIR LACTAMIZABLE PRECURSORS
Luigi Giuffre, Milan, and Giancarlo Sioli, Como, Italy, assignor to Snia Viscosa Società Nazionale Industria Applicazioni Viscosa S.p.A., Milan, Italy
Filed June 30, 1970, Ser. No. 51,268
Int. Cl. C07d 41/06
U.S. Cl. 260—239.3 A    12 Claims

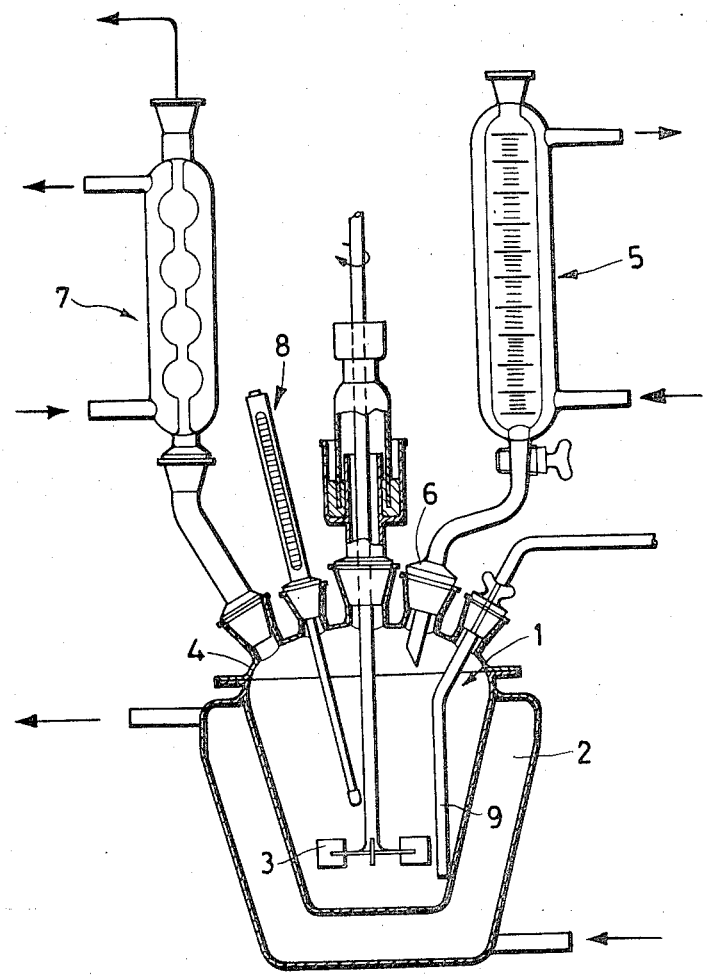

ABSTRACT OF THE DISCLOSURE

There is described a process for the preparation of omega-lactams having the general formula:

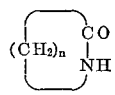

wherein $n=$ from 2 to 13, and/or of their lactamizable precursors, which may be cycloaliphatic oximes or cycloaliphatic nitroso derivatives, monomers or dimers characterized by the fact that the corresponding cyclomethylene ketene, having the general formula

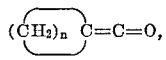

where $n$ has the aforementioned value, is subjected to nitrosation with a nitrosating agent of the formula NOX, where X can be —$HSO_4$, —Cl, —$NO_2$, —OR (in which R indicates an alkyl or aryl organic substituent), at a temperature comprised between —60° C. and +100° C.

---

This invention relates to a method for the preparation of omega-lactams of the general formula

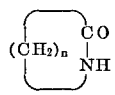

wherein $n$ is from 2 to 13, and of their precursors. The term "precursors," in the present specification and claims is intended to connote those compounds from which, by simple and conventional reactions, particularly decarboxylation, hydrolysis and transposition, lactams can be obtained and, still more specifically, compounds containing a nitroso grouping-NO bound to a cycloaliphatic ring in such a position as to be introduced in the ring by transposition. Obviously, the simplest and most widely known among such precursors are the cycloaliphatic oximes, which can be converted into the corresponding lactams by a mere Beckmann transposition, mostly by treatment with sulphuric acid and oleum or by other known methods. According to the broadest aspect, the method according to the invention is characterized in that, for obtaining any omega-lactam the starting material is the corresponding cyclomethylene ketene of the general formula

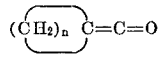

the correspondence being determined in this case by the number of carbon atoms $(n+1)$ which should be the same in the cycloaliphatic ring of the ketene as in the expected lactam, the ketene being subjected to nitrosation and the lactam itself, or a precursor thereof, as the case may be, is again obtained.

By subjecting cyclomethylene ketene to nitrosation by a nitrosating agent of the type NOX, where X is an appropriate grouping such as $HSO_4$, Cl, $NO_2$, OR, wherein R is a general organic substituent, for example of an alkyl or aryl nature, it is possible to arrive at the preparation of the corresponding lactam, having the formula:

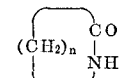

either directly, or through the corresponding oxime, $(CH_2)_nC=NO_4$ or even through a precursor having the formula:

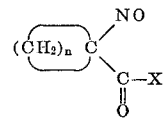

wherien the values of $n$ and X are as above stated.

With particular reference to cyclopentamethylene ketene,

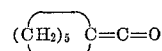

the caprolactam can be directly obtained therefrom by nitrosation, for example with hydrogen nitrosyl sulphate in an acidic solution, preferably made acidic with sulphuric acid. Generally, the caprolactam is obtained by employing any appropriate nitrosating agent. The preferred acidic solvent is sulphuric acid of nearly 100% concentration, for example from 94 to 100% or also oleum. Both sulphuric acid and oleum can be used in the reaction even by adding them alone as such. $SO_3$ can also be used under a form different from oleum.

By operating with a nitrosating agent, preferably nitrosyl hydrogen sulphate, in solution, for example in sulphuric acid, the reaction is carried out at temperatures which vary between —60° C. and +100° C., and preferably between 0° C. and 60° C. Upon reaction, the products mass is hydrolized and the acidity is neutralized, while the dilution and neutralization heats are properly dissipated. The end product can be drawn from the mass thus obtained, and is a raw caprolactam, appropriate means being used, such as extraction by an organic solvent, whereafter the conventional lactam purifications are carried out. By operating with a nitrosation agent which is not dissolved in an acid, the most common precursor of caprolactam, that is, cyclohexanone oxime, can be obtained which can be converted into caprolactam with conventional means, that is, for example, by a Beckmann transposition. In any case the final yields of caprolactam with respect to pentamethylene ketene are high, in the order of at least 70%–90%. There is the advantage, proper of the inventive method, of reducing to minimum values the byproducts of neutralization, more particularly sulphates and especially ammonium sulphate.

The nitrosation agents, in addition to the above suggested nitrosyl sulphate, can be other nitrosyl salts such as the chloride or appropriate organic nitrites.

By performing nitrosation at low temperatures, more particularly not above 0° C., caprolactam precursors other than cyclohexanone oxime can be obtained. To this purpose, the operation can be carried out with advantage in the absence of free acids. More particularly it is possible to separate from the reaction mass as obtained by nitrosation, precipitation and mechanical separation of the precipitates, precursors which are addition compounds of ketene and the nitrosation agent. These addition compounds can be either in monomeric or dimeric form,

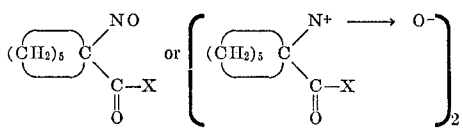

the latter being convertible into monomeric form by dissolution into appropriate solvents.

These precursors can be converted from the monomeric form into caprolactam by decarboxylation and catalytic transposition, and also by treatment with an acid, more particularly sulphuric acid.

The nitrosation reaction is preferably effected in the presence of an organic solvent, in which for example there can be dissolved, at the beginning, the starting ketene.

Particularly suitable as organic solvents are $CCl_4$, cyclohexane, n-heptane, etc., and in general any saturated hydrocarbon with boiling temperature between 70° C. and 100° C.

The organic solvent can be used in amounts within a broad range, for example it can be used in amounts between 100 and 2000 parts by weight for 100 parts of ketene.

Preferably, the said organic solvent serves as extraction agent for the end product, lactam or its precursor and in such case must be solvent thereof.

The quantitative data in respect of the reaction are the following:

The molar ratio between ketene and nitrosating agent, expressed as NO, is between 0.6 and 1.1, and preferably between 0.8 and 1. When sulphuric acid or its derivatives are used, the molar ratio between ketene and total sulphur (contained in all the sulphurated compounds used) is between 0.4 and 1.1 preferably between 0.6 and 1.

The invention has been described hereinbefore with particular reference to the preparation of epsilon-caprolactam or its precursors from cyclopentamethylene ketene, but the same criteria are applicable to the preparation of a lactam having a lower or greater number of carbon atoms from the corresponding ketones, the resultant products being, as the case may be, an omega-caprolactam by direct nitrosation in an acidic environment (more particularly sulphuric acid) and the corresponding oxime, or a precursor formed by the addition compounds (monomeric or diameric) of the starting ketene and the nitrosating agent, by nitrosation in the absence of an acid and according to the conditions (more particularly the temperature conditions).

To illustrate further this invention various examples will now be described of preparation of lactams or precursors which directly may be converted into lactams.

EXAMPLE 1

Preparation of epsilon-caprolactam from cyclopentamethylenketene (PMK)

The implementation which has been used is depicted in the accompanying drawing. The reactor, which is a vesset 1 having a capacity of 200 cu. cms, and has a jacket 2 for circulating a coolant, has a turbine stirrer 3 adapted to create a state of strong turbulence. The lid 4 of the reactor has a calibrated dropping funnel 5 and an opening 6 with ground-glass stopper, intended for the introduction of the reactants, and a reflux condenser 7, a thermometer 8 and a dipping tube 9 for siphoning out the reaction products.

Initially, the reactor is charged with 50 cu. cms. of $CCl_4$, brine at −20° C. being caused to flow through the jacket. By using a calibrated syringe, which has been previously cooled at −60° C., the PMK is drawn from a container kept at −60° C. in a Dewar vessel and introduced into the reactor, by dissolving it into the $CCl_4$. By so doing, 4 grams of PMK (0.03636 g. mols) are dissolved in 50 cu. cms. of $CCl_4$.

Once the stirrer has been started, 0.25 grs. of a nitrosating solution composed of $NOHSO_4$ (75% by wt.) in 99.5%—$H_2SO_4$ which thus contains 5.08 grs. (0.040 g./mol) of $NOHSO_4$ and 1.56 grs. (0.016 g./mol) of $H_2SO_4$, are fed from the dropping funnel during 5 minutes approximately. In the reactor, whose temperature, during the addition of the nitrosant, has been raised to about 0° C., there is obtained a solution of the addition products in the solvent.

The flow of brine is thus stopped and water, coming from a suitable thermostat and whose temperature is being gradually increased, is caused to flow through the jacket 2 of the reactor.

The reactor is thus gradually brought to 40° C., a temperature at which an incipient gas evolution is noticed. At 60° C. this evolution of gas is virtually over. Stirring is discontinued and the mass present in the reactor is drawn through the dipping tube and transferred into an ice-containing beaker.

There have been obtained gases with a $CO_2$ content of 96.1%. To the mass which has already been poured on ice, there are added 19.0 grs. of a 40% aqueous solution of NaOH. The heat of neutralization is dissipated by the ice which has been provided in an excess with respect to the amount necessary to remove the dilution heat.

Upon neutralization, and when almost all the ice has been melted, the mass is transferred to a 250 cu. cms. separator funnel. The mass is decanted and the underlying organic phase is separated by collecting it in a two necked, 500 cu. cms. spherical bottomed flask.

In the separator funnel there are poured 50 c. cms. of fresh $CCl_4$, the whole is vigorously mixed and the organic layer is separated again to be combined with the previous one.

The extraction is repeated twice again with 50 c. cms. of $CCl_4$ each time. All the organic solvent combined in the 500 cu. cms. flask is evaporated in a rotating evaporator at 40° C. and 600 mms. of mercury.

Evaporation is considered as having been completed when two consecutive weighings, effected after periods of evaporation of 15 minutes do not differ by more than 0.05 gr. from one another.

The raw product contained in the flask is 3.38 grs. When subject to infrared analysis, it shows the characteristic band at $1650–1660$ cm.$^{-1}$.

A portion, recrystallized from toluene and dried at 30° C. in a vacuo has a melting point of 69° C., characteristic for caprolactam.

At chromatographic analysis, the purity of the sample is 97.2% so that the pure caprolactam present in the sample is 3.28 grs. i.e. 0.029 mol. The aqueous phase separated in the separator funnel has been evaporated and has given 8.05 grs. of raw sodium sulphate which, when analyzed, has shown a purity of 97%. Pure sodium sulphate obtained is thus 0.005 mol. Thus, there have been produced 1.9 mols. of $NaSO_4$ (approx.) per mol of caprolactam.

The yield of caprolactam with respect to PMK is 80.5%. Instead, the yield with respect to the nitrostating agent (nitrosyl hydrogen sulphate) is 72.5%.

EXAMPLE 2

32 cc. of cyclohexane were placed into the reactor, at room temperature. The temperature was then lowered to 7° C. and, under stirring, 6.21 grs. of pentamethyleneketene (0.0564 mol) was introduced into the solvent with the ketene treatment methods already described in the previous example. After introduction of the reagent, the temperature was taken to −10° C., and in such conditions addition was made, very slowly, of the nitrosating solution, composed of 0.058 mol of $NOHSO_4$, 0.0042 mol of $SO_3$, 0.0133 mol of $H_2SO_4$. The said solution has a melting point of approximately 60° C. and should be kept in the metering vessel at a temperature slightly higher than 60° C. The reactor is cooled, during the addition of the nitrosating agent, so as to ensure that the temperature of the suspension contained in it does not exceed 0° C. By means of a successive gradual heating up to the boiling temperature of the solvent, which is condensed by reflux, there is obtained the decarboxylation of the compound of addition forming at low temperature, and the formation of the sulphate of epsilon-caprolactam from which by dilution with water and successive neutralization, carried out in the manner already described in the previous example, there is obtained the caprolactam, which is extracted with solvent.

In this case 0.0508 mol of epsilon-caprolactam were recovered, its purity being 98%; the production of sulphate is in this case approximately 1.5 mols per mol of epsilon-caprolactam obtained. The yield of caprolactam over PMK is 90.1 percent.

EXAMPLE 3

Preparation of a precursor of epsilon-caprolactam as a dimer and conversion into oxime A solution of 4.51 grs. of cyclopentamethylene ketene in $CCl_4$ is prepared with the same implementation of Example 1 and with the same procedure.

Upon starting the stirrer, the solution is brought to a low temperature by circulating brine at −40° C. in the reactor jacket.

At this temperature an absorption of nitrosyl chloride NOCl is effected by causing gas, coming from an ancilliary evaporation apparatus, to bubble therethrough in an appropriate manner.

The solution takes a blue-green colour, which has been recognized by us to be due to the formation of an addition compound between the ketene and the NOCl. By gradually bringing the temperature to 0°. C., the aforementioned colour is discharged and the precipitation of the addition compound in dimerized form is experienced.

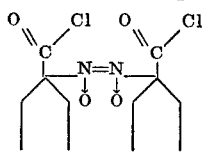

Upon completion of the precipitation, at room temperature, the contents of the reactor are transferred in its entirety, by effecting consecutive washings of the vessel with $CCl_4$, into a filter where the crystallized product is quantitatively collected in the form of a filter cake.

The cake, washed with $CCl_4$ again and dried over the filter, is then slurried in a water-dioxane mixture which also contains 1 gram of NaOH per 100 cu. cms. of mixture.

The crystals become gradually dissolved by stirring the slurry at 30° C. On completion of the dissolution and by lowering the temperature to 0° C. and acidifying with $HNO_3$, until a slightly acidic reaction is obtained, a white crystalline product precipitates, which has been recognized by use to be a precursor of cyclohexanone oxime, and exactly the dimeric form of nitrosocyclohexanecarboxylic acid.

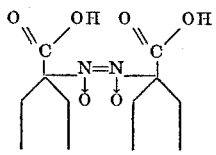

The crystals are the recovered by filtration, slurried in benzene and the slurry is caused to boil, with reflux condensation of the evolved vapors. A gradual dissolution of the crystals is observed, which is an evidence of the decomposition of the precursor and formation of cyclohexanone oxime.

The weighing of oxime has shown a virtually quantitative yield of respect to the employed cyclopentamethylene ketene.

EXAMPLE 4

Preparation of a precursor of epsilon-caprolactam, conversion into oxime and lactam By operating under the conditions already described for the preceding cases, a solution has been prepared, consisting of 6.22 grs. of cyclopentamethylene ketene in 50 cu. cms. of $CCl_4$. To this solution, which has been previously brought to −40° C., there have been added 10.53 grs. of a solution of nitrosyl hydrogen sulphate in sulphuric acid. The composition of such nitrostating solution was as follows:

|  | Percent |
|---|---|
| $NOHSO_4$ | 72.5 |
| $H_2O$ | 0.6 |
| $HNO_3$ | Traces |
| $H_2SO_4$, Balance to 100 | | and its melting point was about 40° C.

As in the case of Example 2, by maintaining the temperature at −40° C., the appearance of the same kind of blue-green colour has been observed, an evidence of the formation of the addition compound between ketene and nitrosyl hydrogen sulphate, to which the following structure can be attributed:

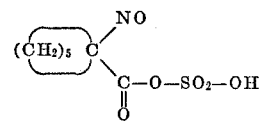

By gradually raising the temperature to 0° C., the green colour is discharged and the mass takes a resin-like appearance with a straw colour, from which the chlorinated solvent is easily separated by gravity.

By raising the temperature further, gas evolution is observed, which begins at about 30° C. and continues as the temperature is gradually raised.

As about 50° C. are reached, a portion of the mass, with the procedure of Example 1, is poured over ice and hydrolized.

Upon alkalization, a product is extracted, which, examined at infrared spectrum, is detected to be cyclohexanone oxime and caprolactam.

EXAMPLE 5

39.5 grs. of undecamethylene ketene (UMK) of 98.0% purity was placed into a reactor in the same way as described in the previous examples, together with 100 cc. of $CCl_4$, with the temperature maintained at approximately 0° C.

There was then poured slowly into the solution, kept under vigorous stirring, 38.28 grs. of a solution of $NOHSO_4$ in $H_2SO_4$ (73%), again at a temperature of 0° C.

When such addition has been completed, bring the mixture to room temperature and then maintain this temperature for between 40 and 60 minutes.

At this point, heat the mixture so as to reach the boiling temperature of the solvent in approximately 15 minutes.

Reaction is effected at this temperature for a further 15 minutes, then cool the mass rapidly to 0° C.

Into the reactor add 65 grs. of water and ice, and from the thus diluted reaction mixture extract, with the methods described in the previous examples, 32.0 grs. of a white crystalline product with melt point of 150° C., which is identified as Laurolactam of 98.5% purity. The reaction yield over the starting UMK is 80%.

The embodiments of the invention in which an exclusive property or privilege is claimed are defined as follows:

1. Process for the preparation of ω lactams having the formula:

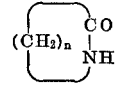

wherein $n$=from 5 to 13, and of their lactamizable precursors, which comprise cycloaliphatic oximes and cycloaliphatic nitroso derivatives corresponding to said lactams, comprising subjecting the corresponding cyclomethylene ketene, having the formula $(CH_2)_nC=C=O$, where $n$ has the aforementioned value, to nitrosation with a nitrosating agent of the formula NOX, where X is —$HSO_4$, —Cl, —$NO_2$, —OR and R is an alkyl or aryl organic substituent, at a temperature between —60° and +100° C.

2. Process according to claim 1, in which the molar ratio between the starting ketene and the nitrosating agent, expressed as NO, is between 0.6 and 1.1.

3. Process according to claim 1, in which the nitrosation is carried out in the presence of an organic solvent.

4. Process according to claim 3, in which the solvent is selected from the group consisting of $CCl_4$, cyclohexane, and a saturated hydrocarbon the boiling temperature of which is between 70° and 100° C., and which is employed in an amount between 100 and 2000 parts by weight for every 100 parts of the ketene.

5. Process according to claim 1, in which the nitrosating agent is nitrosyl acid sulphate.

6. Process according to claim 1, in which for obtaining the lactam directly a nitrosating agent in an acid solution, selected from the group consisting of sulphuric acid solution, and oleum solution is used.

7. Process according to claim 6, in which use is made of sulphuric acid in a concentration between 94 and 100%.

8. Process according to claim 6, in which the acid solution consists of sulphuric anhydride in sulphuric acid.

9. Process according to claim 8, in which use is made of oleum containing from 1 to 60% by weight of $SO_3$.

10. Process for the preparation of an omega-lactam, from the corresponding cyclomethyleneketene, wherein the ketene is nitrosated with a solution of a nitrosating agent in concentrated sulphuric acid solution, the reaction product is hydrolyzed and neutralized and from the neutralized mass the lactam is extracted.

11. Process for the preparation of omega-lactam comprising the preparation of a precursor of the omega-lactam by nitrosation of a cyclomethyleneketene corresponding to the desired omega-lactam and conversion of the precursor into the lactam by Beckmann transposition of the oxime corresponding to the lactam.

12. Process according to claim 1, in which the cyclomethyleneketene subjected to nitrosation is the cycloundecanethyleneketene, and the lactam produced is laurolactam.

References Cited
UNITED STATES PATENTS 3,022,291  2/1962  Muench et al. ____ 260—239.3 A HENRY R. JILES, Primary Examiner R. T. BOND, Assistant Examiner U.S. Cl. X.R.

260—141, 563 R, 566 A, 585.5